United States Patent
Ishimaru et al.

(10) Patent No.: US 11,340,688 B2
(45) Date of Patent: May 24, 2022

(54) ELECTRONIC APPARATUS AND CONTROL METHOD OF ELECTRONIC APPARATUS

(71) Applicant: CANON KABUSHIKI KAISHA, Tokyo (JP)

(72) Inventors: Satoshi Ishimaru, Kawasaki (JP); Takutomi Ogawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 367 days.

(21) Appl. No.: 16/362,080

(22) Filed: Mar. 22, 2019

(65) Prior Publication Data
US 2019/0294230 A1 Sep. 26, 2019

(30) Foreign Application Priority Data
Mar. 23, 2018 (JP) .............................. JP2018-056275

(51) Int. Cl.
*G06F 1/3234* (2019.01)
*G06F 3/04817* (2022.01)
*G06F 9/30* (2018.01)
*G06F 1/26* (2006.01)

(52) U.S. Cl.
CPC ............ *G06F 1/3265* (2013.01); *G06F 1/263* (2013.01); *G06F 3/04817* (2013.01); *G06F 9/3004* (2013.01)

(58) Field of Classification Search
CPC .... G06F 1/3265; G06F 1/263; G06F 3/04817; G06F 9/3004
See application file for complete search history.

(56) References Cited

U.S. PATENT DOCUMENTS

| | | | | |
|---|---|---|---|---|
| 2007/0214296 A1* | 9/2007 | Takamatsu | ............ | H02J 7/0029 710/63 |
| 2008/0045275 A1* | 2/2008 | Le | ............ | G06F 1/263 455/572 |
| 2010/0315249 A1* | 12/2010 | Imai | ...................... | G06F 1/3212 340/636.12 |
| 2011/0009172 A1* | 1/2011 | Song | ................. | H04M 1/72427 455/573 |
| 2016/0291666 A1* | 10/2016 | Hosoya | .................... | G06F 1/163 |
| 2019/0272013 A1* | 9/2019 | Nagatomi | ................ | G06F 1/30 |

FOREIGN PATENT DOCUMENTS

JP 2005-253147 A 9/2005

* cited by examiner

*Primary Examiner* — Gary Collins
(74) *Attorney, Agent, or Firm* — Cowan, Liebowitz & Latman, P.C.

(57) ABSTRACT

An electronic apparatus, comprising a display control unit which performs control that in a first case where power supplies are connected to both a first power supply input unit and a second power supply input unit and a power supply capability from the first power supply input unit does not satisfy a prescribed criterion, a remaining capability of power supply from the second power supply input unit is displayed in a display appearance that differs from a remaining time or indicates that the remaining time is longer, and in a second case where a power supply is not connected to the first power supply input unit but a power supply is connected to the second power supply input unit, the remaining capability of power supply from the second power supply input unit is displayed in a second display appearance which indicates the remaining time.

17 Claims, 8 Drawing Sheets

FIG.3A
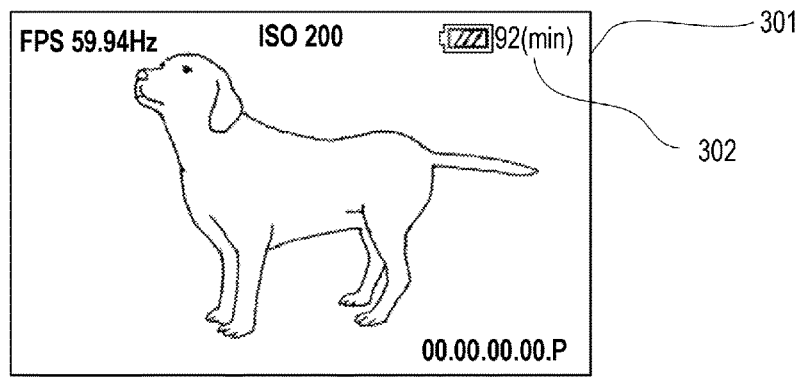
FIG.3B
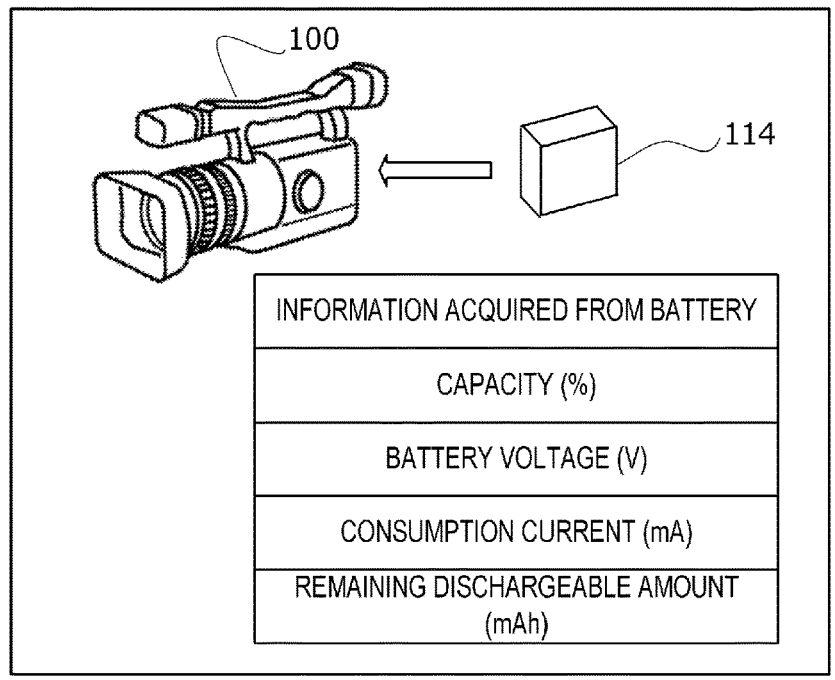
FIG.3C
| CAPACITY | BATTERY ICON |
|---|---|
| 75(%) < CAPACITY(%) <=100(%) | |
| 50(%) < CAPACITY(%) <=75(%) | |
| 25(%) < CAPACITY(%) <=50(%) | |
| 0(%) <= CAPACITY(%) <=25(%) | |
| WHEN COMMUNICATION CANNOT BE ESTABLISHED | |

ELECTRONIC APPARATUS AND CONTROL METHOD OF ELECTRONIC APPARATUS

BACKGROUND OF THE INVENTION

Field of the Invention

The present invention relates to an electronic apparatus and a control method of the electronic apparatus.

Description of the Related Art

Many conventional electronic devices (electronic apparatuses) use chargeable/dischargeable batteries, among which a lithium ion battery (hereinafter, a battery) is well known, or adapters (hereinafter, power supply adapters) that apply DC voltage as a power supply. In addition, there are also many electronic apparatuses provided with a plurality of terminals for receiving input of power. While terminals into which power is input from a battery have special shapes, terminals into which power is input from a power supply adapter are often general-purpose terminals such as round pins.

In a known method, when power is being simultaneously supplied to such an electronic apparatus from terminals of both a battery and a power supply adapter, the electronic apparatus preferentially uses the power supply with a higher voltage (a power supply capability) in order to cause power to be supplied more stably (Japanese Patent Application Laid-open No. 2005-253147). In this case, in order to prioritize supply from the power supply adapter, an output voltage of the power supply adapter is set higher than an output voltage of the battery. In addition, there are electronic apparatuses which are capable of acquiring, when a CPU is built into a battery, a remaining dischargeable amount and a load current (a consumption current) of the battery by communicating with the CPU inside the battery. Such electronic apparatuses enable a user to comprehend a power supply status of the electronic apparatus by calculating a drivable time of the electronic apparatus based on the remaining dischargeable amount and the load current and displaying the drivable time on a screen or the like. In this case, a remaining dischargeable amount refers to a total amount of power which can be supplied by the battery.

SUMMARY OF THE INVENTION

However, with the technique disclosed in Japanese Patent Application Laid-open No. 2005-253147, when voltage of the battery and voltage of the power supply adapter have more or less a same potential, the electronic apparatus intermittently switches the power supply that is a supply source between the battery and the power supply adapter. In such a case, even if a drivable time of the electronic apparatus is displayed in order to enable the user to comprehend the power supply status of the electronic apparatus, since the load current of the battery does not stabilize, the drivable time calculated from the remaining dischargeable amount and the load current of the battery is not accurate. Therefore, there is a problem in that the user cannot accurately comprehend the power supply status of the electronic apparatus.

In consideration thereof, an object of the present invention is to provide an electronic apparatus which selects a power supply that is a supply source of power in accordance with power supply capabilities of power supplies and which enables a user to more accurately comprehend a power supply status of the electronic apparatus.

An aspect of the present invention is an electronic apparatus, comprising:
a first power supply input unit,
a second power supply input unit, and
a memory and at least one processor and/or at least one circuit to perform the operations of the following units:
a first determining unit configured to determine a power supply capability from the first power supply input unit;
a second determining unit configured to determine a power supply capability from the second power supply input unit;
a control unit configured to perform control so that, in a first case, supply of power is received from whichever of the first power supply input unit and the second power supply input unit that has a higher power supply capability,
wherein the first case is a case where power supplies are connected to both the first power supply input unit and the second power supply input unit, and the power supply capability from the first power supply input unit does not satisfy a prescribed criterion; and
a display control unit configured to perform control so that
in the first case, a remaining capability of power supply from the second power supply input unit is displayed in a first display appearance which is a display appearance that shows the remaining capability by other than a remaining time or a display appearance indicating that an actual drivable time is longer than a displayed time, and
in a second case where a power supply is not connected to the first power supply input unit but a power supply is connected to the second power supply input unit, the remaining capability of power supply from the second power supply input unit is displayed in a second display appearance which indicates the remaining time.

According to the present invention, an electronic apparatus which selects a power supply that is a supply source of power in accordance with power supply capabilities of power supplies enables a user to more accurately comprehend a power supply status of the electronic apparatus.

Further features of the present invention will become apparent from the following description of exemplary embodiments with reference to the attached drawings.

BRIEF DESCRIPTION OF THE DRAWINGS

FIGS. 3A to 3C are diagrams illustrating a process of displaying a remaining battery capability according to the first embodiment;

DESCRIPTION OF THE EMBODIMENTS

Hereinafter, preferred embodiments of the present invention will be described in detail with reference to the accompanying drawings. It is to be understood that the technical scope of the present invention is not intended to be limited by any of the individual embodiments described below and is to be defined by the scope of claims. Furthermore, not all of the combinations of features described in the embodiments are essential to the present invention.

First Embodiment

In the present embodiment, an electronic apparatus will be described to which a battery (an internal power supply) and a power supply adapter (an external power supply) can be connected and which selects a power supply to supply power in accordance with power supply capabilities of the respective power supplies. In this case, a power supply capability represents a magnitude, stability, or the like of power (voltage) supplied by a power supply. The electronic apparatus according to the present embodiment varies a display appearance of a remaining battery capability in accordance with a power supply capability of the battery and a power supply capability of the power supply adapter so as to enable a user to more accurately comprehend a power supply status. In this case, a remaining capability of a battery refers to information related to power which the battery is capable of supplying to the electronic apparatus at a time point when the battery is connected to the electronic apparatus.

(Configuration of Electronic Device System)

Figure 1:
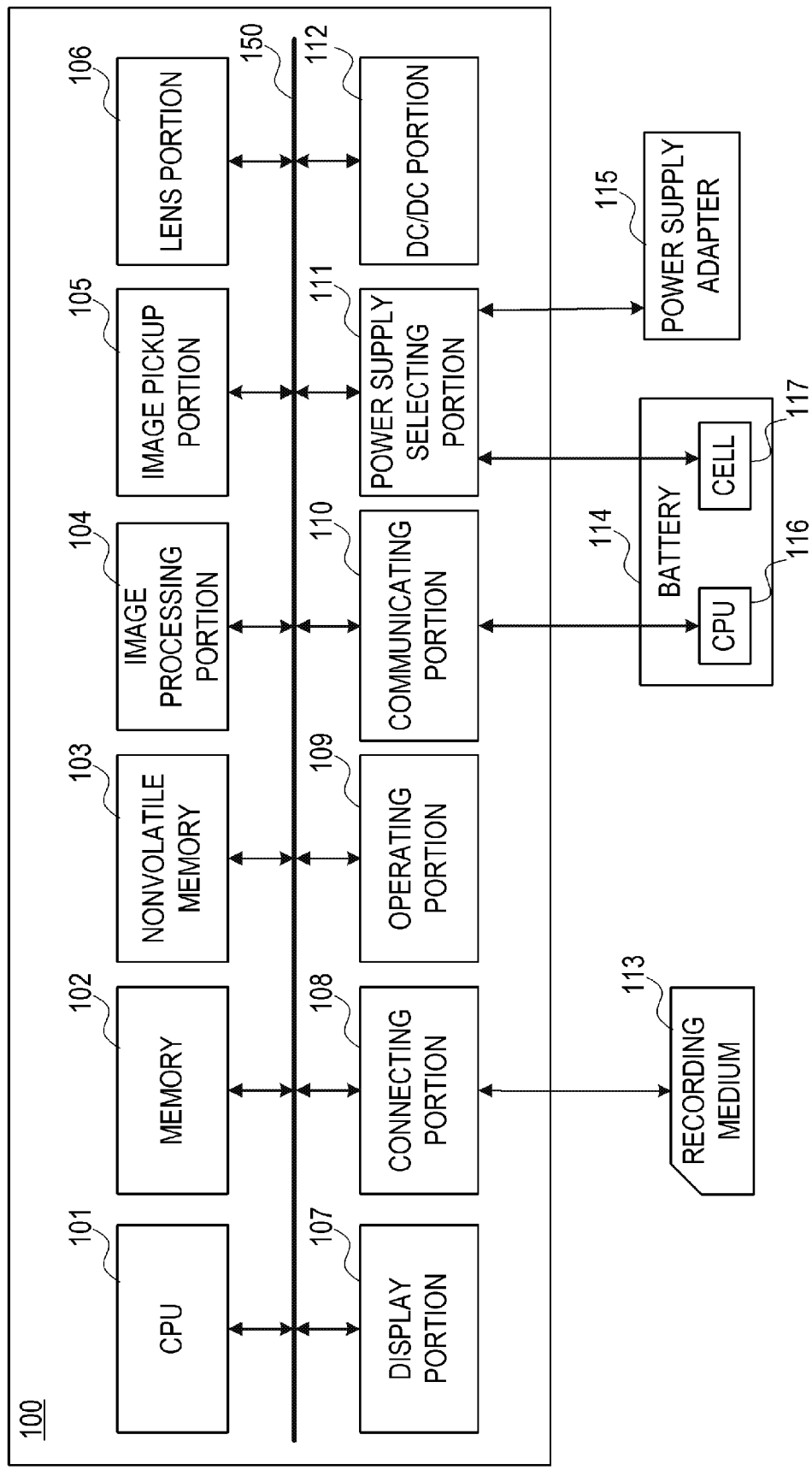
FIG. 1 is a diagram showing a configuration of an electronic apparatus system according to a first embodiment.

FIG. 1 is a diagram showing a configuration of an electronic apparatus system according to the present embodiment. The electronic apparatus system according to the present embodiment is constituted by an electronic apparatus 100, a recording medium 113, a battery 114, and a power supply adapter 115. In the present embodiment, a case where the electronic apparatus 100 is an image pickup device will be described as an example. Hereinafter, a summary of each functional portion of the electronic apparatus 100, the recording medium 113, the battery 114, and the power supply adapter 115 will be presented and processes performed by the electronic apparatus 100 in order to display a remaining capability of power supply of the battery 114 will be described later.

The electronic apparatus 100 has a CPU 101, a memory 102, a nonvolatile memory 103, an image processing portion 104, an image pickup portion 105, a lens portion 106, a display portion 107, a connecting portion 108, an operating portion 109, a communicating portion 110, a power supply selecting portion 111, and a DC/DC portion 112. The battery 114 has a CPU 116 and a battery cell 117. The connecting portion 108 is connected to the recording medium 113. In addition, the communicating portion 110 is connected to the CPU 116. Furthermore, the power supply selecting portion 111 is connected to the battery cell 117 and the power supply adapter 115. The respective functional portions of the electronic apparatus 100 input and output data to and from each other via an internal bus 150.

Although the electronic apparatus 100 is assumed to be an image pickup device and is therefore configured as shown in FIG. 1 in the present embodiment, the present invention can also be realized by other electronic apparatuses such as a smartphone and a notebook computer. Therefore, the image processing portion 104, the image pickup portion 105, the lens portion 106, the display portion 107, the connecting portion 108, the operating portion 109, and the DC/DC portion 112 in the electronic apparatus 100 are not essential.

The CPU 101 is a central processing unit which controls the plurality of functional portions of the electronic apparatus 100. The CPU 101 controls the plurality of functional portions of the electronic apparatus 100 as necessary in accordance with, for example, a program stored in the nonvolatile memory 103 to be described later.

The memory 102 is, for example, a volatile memory using a semiconductor element such as a RAM (Random Access Memory) and is used as a work memory by the CPU 101.

The nonvolatile memory 103 stores image data and speech data, other data, various programs that enable the CPU 101 to operate, and the like. The nonvolatile memory 103 is constituted by, for example, a hard disk (HD), a solid state drive (SSD), a ROM (Read-Only Memory), or the like.

Under control by the CPU 101, the image processing portion 104 performs various image processing on image data and video signals stored in the memory 102, the nonvolatile memory 103, and the recording medium 113, image data of images picked up by the image pickup portion 105, and the like. Image processing performed by the image processing portion 104 includes an A/D (analog-digital) conversion process and a D/A (digital-analog) conversion process as well as an encoding process, a compression process, a decoding process, an enlargement/reduction process (resizing), a noise reduction process, and a color conversion process of image data. The image processing portion 104 may be constituted by a dedicated circuit block for performing specific image processing. In addition, depending on a type of image processing, the CPU 101 may perform the image processing in accordance with a program without using the image processing portion 104.

The image pickup portion 105 is an image pickup element such as a CCD (Charge Coupled Device) sensor, a CMOS (Complementary MOS) sensor, and the like. The image pickup portion 105 is capable of picking up still images and moving images under control by the CPU 101. Image data of picked-up images are transmitted to the image processing portion 104 and, after being subjected to various processes, each piece of image data is recorded in the nonvolatile memory 103 or the recording medium 113 as a still image file or a moving image file.

The lens portion 106 is a lens unit constituted by a zoom lens, a focusing lens, a shutter, an aperture, a ranging portion, an A/D converter, and the like. The lens portion 106 is capable of adjusting a zoom, a focus, an aperture, and the like under control by the CPU 101.

The display portion 107 displays images, a GUI (Graphical User Interface) screen constituting a GUI, and the like under control by the CPU 101. A video signal or the like generated by each functional portion of the electronic apparatus 100 controlled by the CPU 101 is input to the display portion 107. The display portion 107 displays a video (an image) based on the input video signal or the like. While the electronic apparatus 100 is provided with the display portion 107 in the present embodiment, alternatively, the display portion 107 may be a monitor or a projector outside of the electronic apparatus 100.

The connecting portion 108 is connected to the recording medium 113. The connecting portion 108 is an interface for reading data from and writing data to the recording medium 113 to which the connecting portion 108 is connected under control of the CPU 101.

The operating portion 109 is an input device for accepting a user operation including a character information input device such as a keyboard, a pointing device such as a mouse or a touch panel, a button, a dial, a joystick, a touch sensor, and a touch pad. A touch panel refers to an input device which is planarly configured so as to overlap with the display portion 107 and to output coordinate information in accordance with a touched position. An input user operation is notified to the CPU 101.

The communicating portion 110 is connected to the battery 114. The communicating portion 110 is an interface for performing input and output in order to communicate information related to a type of the battery 114, a charged state, a remaining capacity, or the like of the battery cell 117, and the like between the CPU 101 and the CPU 116 inside the battery. In other words, the communicating portion 110 may also be considered an acquisition unit according to the present embodiment.

Figure 2:
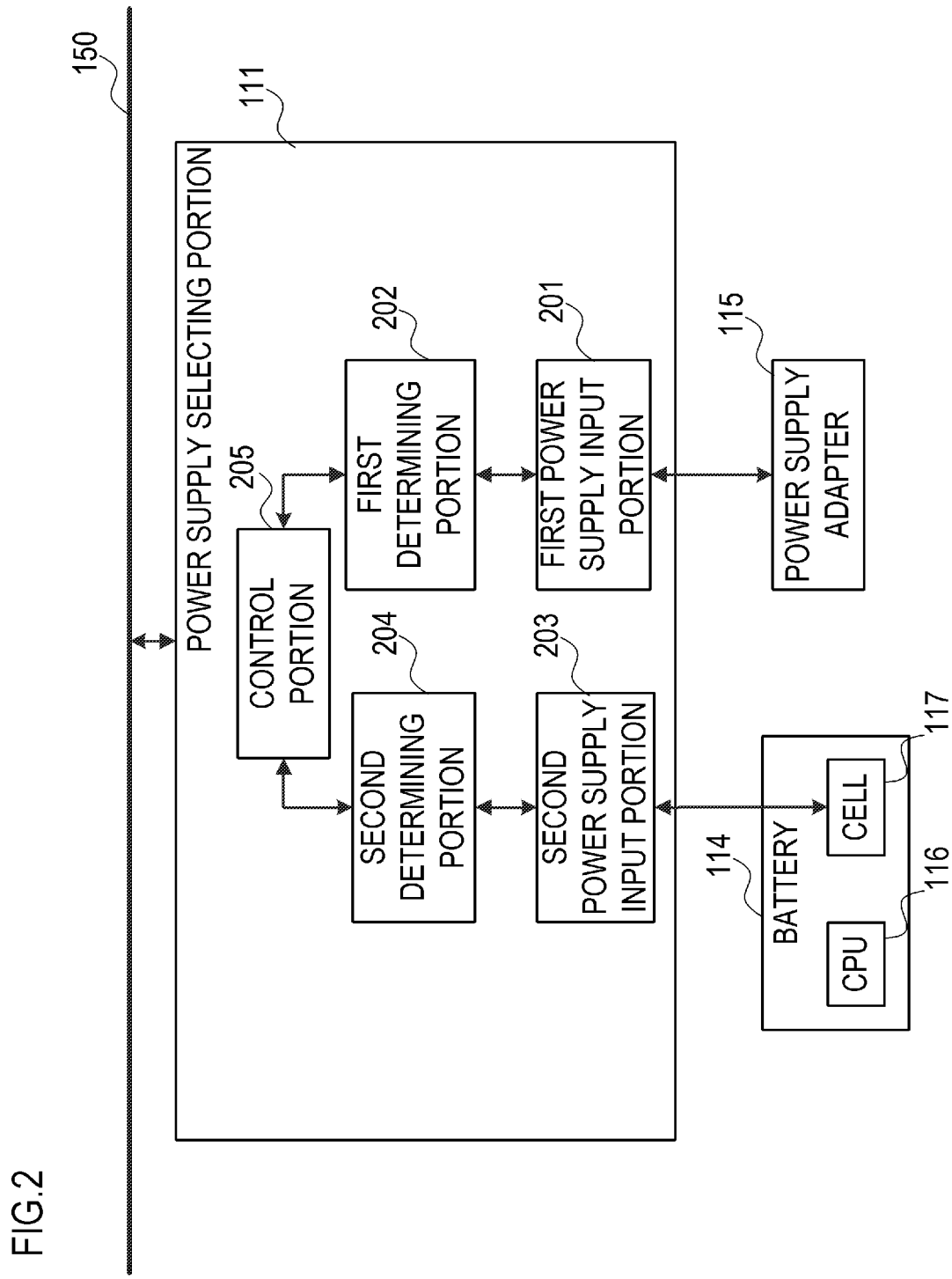
FIG. 2 is a diagram showing a configuration of a power supply selecting portion according to the first embodiment.

The power supply selecting portion 111 is a power supply selection circuit which has power supply input terminals to which the battery 114 and the power supply adapter 115 can be connected and which is constituted by a comparator, a load switch, or the like. Under control of the CPU 101, the power supply selecting portion 111 preferentially selects whichever of the battery 114 and the power supply adapter 115 that has a higher power supply capability as a supply source of power (power supply) to the electronic apparatus 100. It should be noted that as long as the power supply capability of the power supply adapter 115 satisfies a prescribed criterion, the power supply adapter 115 may be used as the power supply that is the supply source of the electronic apparatus 100 regardless of the power supply capability of the battery 114. While it is assumed that the power supply capability represents a magnitude of input voltage in the present embodiment, the power supply capability is not limited thereto and may correspond to, for example, a degree of stability of input voltage. In addition, the power supply selecting portion 111 can subject the respective input voltages of the connected battery 114 and power supply adapter 115 to A/D conversion and the CPU 101 can acquire values obtained by the A/D conversion. FIG. 2 is a diagram showing a detailed configuration of the power supply selecting portion 111. The power supply selecting portion 111 has a first power supply input portion 201, a first determining portion 202, a second power supply input portion 203, a second determining portion 204, and a control portion 205.

Power is supplied to the first power supply input portion 201 from the power supply adapter 115. The first determining portion 202 is a processing circuit which is controlled by the CPU 101 and determines a magnitude of input voltage supplied from the power supply adapter 115 via the first power supply input portion 201. In other words, the first determining portion 202 determines a power supply capability input from the first power supply input portion 201. The determined magnitude of the input voltage is output to the control portion 205.

Power is supplied to the second power supply input portion 203 from the battery 114. The second determining portion 204 is a processing circuit which is controlled by the CPU 101 and determines a magnitude of input voltage supplied from the battery 114 via the second power supply input portion 203. In other words, the second determining portion 204 determines a power supply capability input from the second power supply input portion 203. The determined magnitude of the input voltage is output to the control portion 205.

Under control of the CPU 101, the control portion 205 compares a magnitude of the input voltage input from the first determining portion 202 and a magnitude of the input voltage input from the second determining portion 204 with each other and determines whichever power supply that has a larger input voltage as a supply source of power. In other words, power is supplied to the electronic apparatus 100 from whichever of the battery 114 and the power supply adapter 115 that has a larger input voltage. This can be rephrased as the control portion 205 using whichever of the first power supply input portion 201 and the second power supply input portion 203 that supplies a larger input voltage as the supply source of power.

The DC/DC portion 112 converts the input voltage of supplied power into voltage necessary for the electronic apparatus 100 to operate under control of the CPU 101.

The recording medium 113 is a recording medium (a storage medium) such as a memory card, a CD, or a DVD. For example, the recording medium 113 records (stores) data for updating the program stored in the nonvolatile memory 103. For example, the recording medium 113 records image data of images photographed by the electronic apparatus 100. It should be noted that, since the electronic apparatus 100 includes the nonvolatile memory 103, the recording medium 113 is not essential to the electronic apparatus system.

The battery 114 is a chargeable battery power supply (a storage battery) which is capable of supplying power to the electronic apparatus 100 and which can be connected (mounted) to and disconnected from the electronic apparatus 100. The battery 114 has the CPU 116 and the battery cell 117, and an amount of power that can be supplied to the electronic apparatus 100 is limited by an amount of power included in the battery cell 117. In the battery 114, power is supplied to the electronic apparatus 100 by the battery cell 117 and a charge status and a remaining capacity of the battery cell 117 are managed by the CPU 116. In the present embodiment, since the battery 114 is a power supply that is assumed to be connected to an inside of the electronic apparatus 100, the battery 114 can be described an internal power supply of the electronic apparatus 100.

The power supply adapter 115 is a power supply which is capable of supplying power to the electronic apparatus 100 and which can be connected (mounted) to and disconnected from the electronic apparatus 100. The power supply adapter 115 converts power supplied from, for example, a commercial power supply into power with a format conforming to the electronic apparatus 100 and supplies the converted power to the electronic apparatus 100. In the present embodiment, since the power supply adapter 115 is a power supply that is not expected to be connected to an inside of the electronic apparatus 100, the power supply adapter 115 can be described an external power supply of the electronic apparatus 100.

(Example of Displaying Remaining Capability of Battery)

FIGS. 3A, 3B, and 3C are diagrams illustrating a process of displaying, on the display portion 107 according to the present embodiment, a remaining battery capability that is information related to power that can be supplied by the battery 114 to the electronic apparatus 100. Hereinafter, an example in which the display portion 107 displays a battery icon 301 and a drivable time 302 as shown in FIG. 3A will be described. In the present embodiment, the battery icon 301 is an icon which enables the user to visually comprehend a remaining capacity of the battery 114 and which indicates whether or not the battery 114 is an authenticated power supply. The drivable time 302 represents a time (a remaining time) during which the electronic apparatus 100 is driven by the power supplied by the battery 114.

As shown in FIG. 3B, the CPU 101 communicates with the battery 114 via the communicating portion 110 and acquires information necessary for displaying the battery icon 301 and the drivable time 302 of the electronic apparatus 100. Pieces of acquired information include a "capacity", a "battery voltage", a "consumption current", and a "remaining dischargeable amount (remaining discharge amount)" and are related to a remaining capability of power supply of the battery 114. The CPU 101 displays the remaining capability of power supply based on these pieces of information. In this case, the "capacity" represents a charge level (remaining capacity) indicating how much the battery 114 is charged and is information expressed as a percentage relative to a case of maximum charge being 100%. The "battery voltage" represents information on an input voltage of power supplied by the battery 114. The "consumption current" represents information on a current of power supplied by the battery 114. The "remaining dischargeable amount (remaining discharge amount)" represents information on a total amount of power which is supplied (can be supplied) by the battery 114. Alternatively, the "battery voltage" need not be acquired since the CPU 101 is capable of measuring the input voltage of the battery 114 via the second determining portion 204.

Using the "consumption current" and the "remaining dischargeable amount" acquired from the battery 114 via the communicating portion 110, the CPU 101 calculates the drivable time 302 of the electronic apparatus 100 according to Expression 1 below.

$$\text{Drivable time(min)} = \frac{\text{Remaining dischargeable amount (mAh)}}{\text{Consumption current (mA)}} \times 60 \text{(min)} \quad \text{(Expression 1)}$$

In addition, using the "capacity" acquired from the battery 114, the CPU 101 determines the battery icon 301 to be displayed of the battery 114 based on a classification shown in FIG. 3C. For example, when information on the "capacity" has been acquired, the battery icon 301 is an icon of a battery indicating that the larger an area represented by a hatched pattern, the larger the remaining capacity. In other words, the pattern of the battery icon 301 differs depending on a magnitude of the "capacity". In addition, for example, when communication with the battery 114 cannot be established, the battery icon 301 takes the form of a "?" icon representing an unknown battery as shown in FIG. 3C. In this case, the battery icon 301 is not limited to a "?" icon and, since the user need only be able to comprehend that the battery is an unknown battery, an "!" icon may be used or characters reading "unknown" may be displayed instead.

The CPU 101 notifies the display portion 107 of information on the battery icon 301 and information on the drivable time 302 of the electronic apparatus 100. In addition, the CPU 101 controls the display portion 107 and displays a remaining capability using the battery icon 301 and the drivable time 302 as shown in FIG. 3A. For this reason, in the present embodiment, the CPU 101 may also be considered a display control unit of the electronic apparatus 100.

(Processing Flow Chart of Displaying Remaining Capability of Battery)

While an example in which both a battery icon and a drivable time are displayed has been described in the example of remaining battery capability display presented above, in the present embodiment, a display appearance is controlled in accordance with an input voltage of the battery 114 and an input voltage of the power supply adapter 115. A control method of a display appearance of the remaining capability display will be described below using the flow chart shown in FIG. 4.

Figure 4:
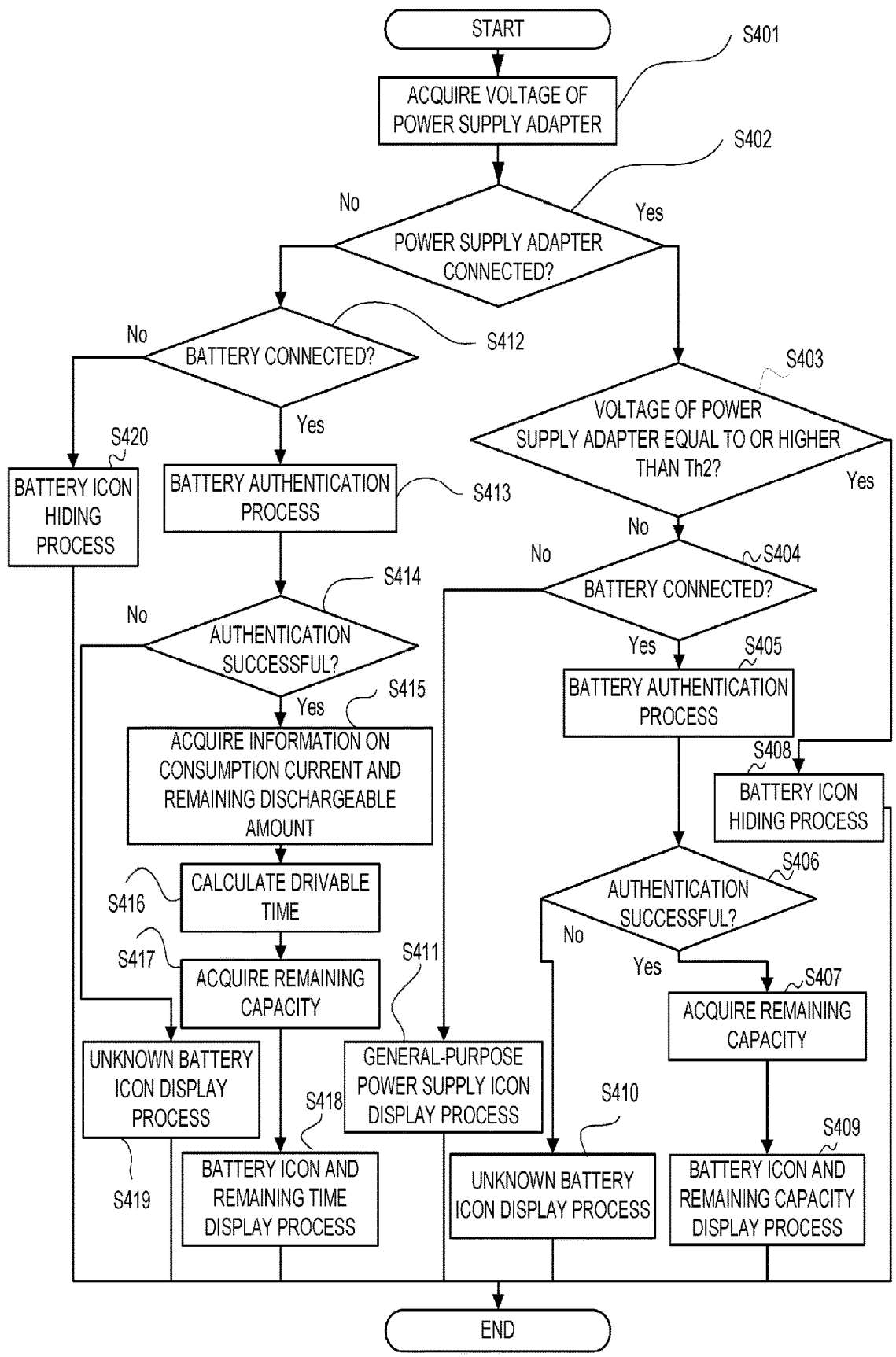
FIG. 4 is a processing flow chart of remaining battery capability display according to the first embodiment.

FIG. 4 is a flow chart showing a process of remaining battery capability display performed by the CPU 101 in accordance with power supply statuses of the power supply adapter 115 and the battery 114. This process is realized as the CPU 101 reads a program from the nonvolatile memory 103 and executes the program.

In S401, the CPU 101 measures, via the first determining portion 202, an input voltage of the power supply adapter 115 which is input to the first power supply input portion 201. Once the process is completed, the step advances to S402.

In S402, the CPU 101 determines whether or not the input voltage of the power supply adapter 115 is equal to or higher than a threshold Th1 set in advance. The CPU 101 determines that the power supply adapter 115 is connected when the input voltage of the power supply adapter 115 is equal to or higher than the threshold Th1 and advances the step to S403. The CPU 101 determines that the power supply adapter 115 is not connected when the input voltage of the power supply adapter 115 is lower than the threshold Th1 and advances the step to S412. The threshold Th1 must be set to a value that is lower than an input voltage necessary for driving the electronic apparatus 100. For example, when the input voltage necessary for driving the electronic apparatus 100 is 12 V, a value around 8 V that is smaller than 12 V may be set as the threshold Th1. In this case, the term driving indicates a state where primary functions of the electronic apparatus 100 are sufficiently usable and, for example, in the present embodiment, refers to a state where image pickup can be performed using the electronic apparatus 100. In other words, in the example described above, a display process and the like by the electronic apparatus 100 can be realized even when the input voltage is lower than 12 V.

In S403, the CPU 101 determines whether or not a power supply capability of the power supply adapter satisfies a prescribed criterion. Specifically, the CPU 101 determines whether or not the input voltage of the power supply adapter 115 is equal to or higher than a threshold Th2 (equal to or higher than a reference value) set in advance. The threshold Th2 is a value which is larger than the threshold Th1 and which causes the power supply adapter 115 to be invariably selected as a supply source power supply (a prioritized power supply) when a plurality of power supplies are connected. When the CPU 101 determines that the input voltage of the power supply adapter is equal to or higher than the threshold Th2 set in advance, the CPU 101 advances the step to S408, but when the CPU 101 determines that the input voltage of the power supply adapter 115 is smaller than the threshold Th2, the CPU 101 advances the step to S404. It should be noted that whether or not a prescribed criterion is satisfied is not limited to a determination based on the input voltage of the power supply adapter 115. For example, when the power supply adapter 115 and the electronic apparatus 100 are capable of communicating with each other, a type of the power supply adapter 115 may be acquired through communication and whether or not a prescribed criterion is satisfied may be determined according to whether or not the type is a power supply adapter type determined in advance.

In S404, the CPU 101 measures, via the second determining portion 204, an input voltage of the battery 114 which is input to the second power supply input portion 203. The CPU 101 determines whether or not the measured input voltage is equal to or higher than a threshold Th3 set in advance. The CPU 101 determines that the battery 114 is connected when the input voltage of the battery 114 is equal to or higher than the threshold Th3. In a similar manner to the threshold Th1, the threshold Th3 must be set to a value that is lower than the input voltage necessary for driving the electronic apparatus 100. For example, when the input voltage necessary for driving the electronic apparatus 100 is 12 V, a value around 8 V that is smaller than 12 V may be set as the threshold Th3. Moreover, the threshold Th3 may be a same value as the first threshold Th1 or may be a different value. When the CPU 101 determines that the battery 114 is connected, the step advances to S405. When the CPU 101 determines that the battery 114 is not connected because the input voltage of the battery 114 is lower than the threshold Th3, the step advances to S411.

In S405, the CPU 101 communicates with the CPU 116 inside the battery 114 via the communicating portion 110 and executes an authentication process. Once the authentication process is completed, the step advances to S406. In this case, the authentication process refers to a process of determining whether or not the battery 114 corresponds to the electronic apparatus 100. For example, the authentication can be deemed a success when information on the "capacity" can be acquired from the battery 114 and the authentication can be deemed a failure when information on the "capacity" cannot be acquired.

In S406, the CPU 101 determines whether or not the authentication process executed in S405 has succeeded. When the CPU 101 determines that the authentication process has succeeded, the step advances to S407, but when the CPU 101 determines that the authentication process has not succeeded, the step advances to S410. For example, when a battery 114 which does not have a communication terminal is connected, since the authentication process in S405 does not succeed, the step advances to S410.

In S407, the CPU 101 communicates with the CPU 116 inside the battery 114 via the communicating portion 110 and acquires information on the "capacity" (the remaining capacity) described with reference to FIG. 3B from the battery 114. Once the process is completed, the step advances to S409.

Figure 5A:
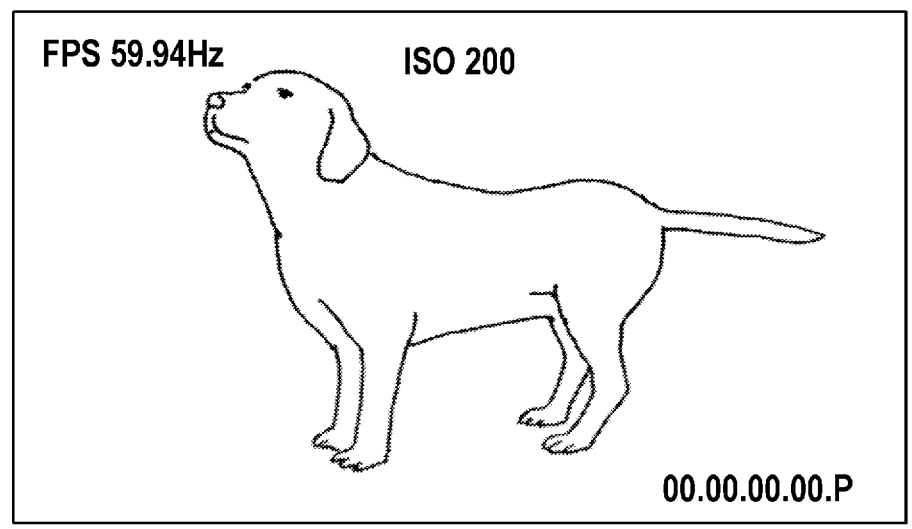
FIGS. 5A to 5D are diagrams showing an example of remaining battery capability display according to the first embodiment.

In S408, as a process of displaying the remaining capability of the battery 114, the CPU 101 performs display control of the display portion 107 and performs a hiding process of the battery icon. FIG. 5A shows a display example in which a hiding process of the battery icon is performed. In S408, based on the determination made in S403, the power supply adapter 115 is inevitably selected as the power supply that is a supply source. Therefore, since there is no power consumption even though the battery 114 is connected, the battery icon is not displayed.

Figure 5B:
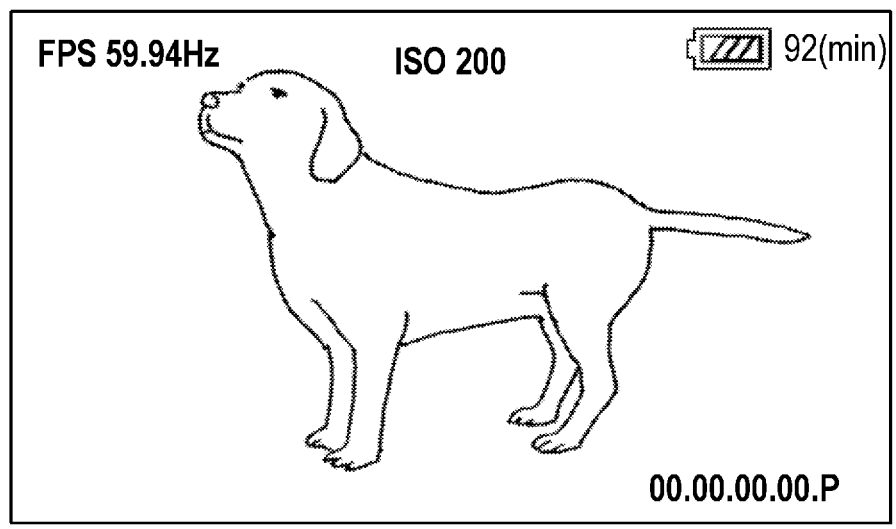
Figure 5C:
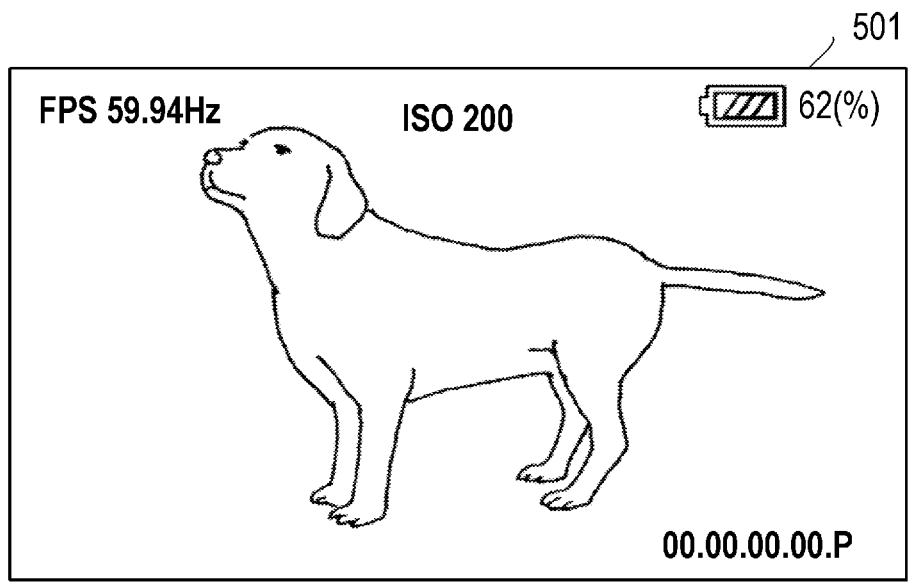

In S409, as a process of remaining battery capability display, the CPU 101 performs display control of the display portion 107 and displays the battery icon and the remaining capacity. FIG. 5C shows a display example in which a displaying process of the battery icon and the remaining capacity is performed. In S409, due to the determination result of S403, the input voltage of the power supply adapter 115 has been determined to be smaller than the threshold Th2 set in advance and there is no guarantee that the power supply adapter 115 is inevitably selected as a supply source power supply. Therefore, for example, when the power supply adapter 115 and the battery 114 have more or less a same potential, since the control portion 205 intermittently switches the power supply that is a supply source between the battery 114 and the power supply adapter 115, the consumption current of the battery 114 does not stabilize. In other words, when the power supply adapter 115 is used as the supply source power supply, the consumption current of the battery is 0, but when the battery 114 is used as the supply source power supply, the consumption current of the battery 114 takes a value that is larger than 0. Accordingly, when using Expression 1 described above, a calculation of the drivable time of the electronic apparatus 100 using a consumption current cannot be performed with accuracy. Therefore, as shown in FIG. 5C, as a display appearance which differs from the drivable time of the electronic apparatus 100, the display portion 107 displays a remaining capacity 501 which can be displayed without using information on a consumption current. In other words, the remaining capacity 501 can be displayed without using information on the consumption current of the battery 114. The user can more readily comprehend the remaining capability of the battery by displaying a remaining capacity that does not vary in accordance with the consumption current of the battery 114 in this manner instead of displaying a drivable time that varies in accordance with the consumption current. Displaying a remaining capacity is not restrictive and, for example, a remaining dischargeable amount may be displayed instead. While an example of displaying the battery icon and the remaining capacity has been described above, as an alternative example, a display appearance may be adopted in which only the battery icon is displayed and the remaining capacity is not displayed.

Figure 5D:
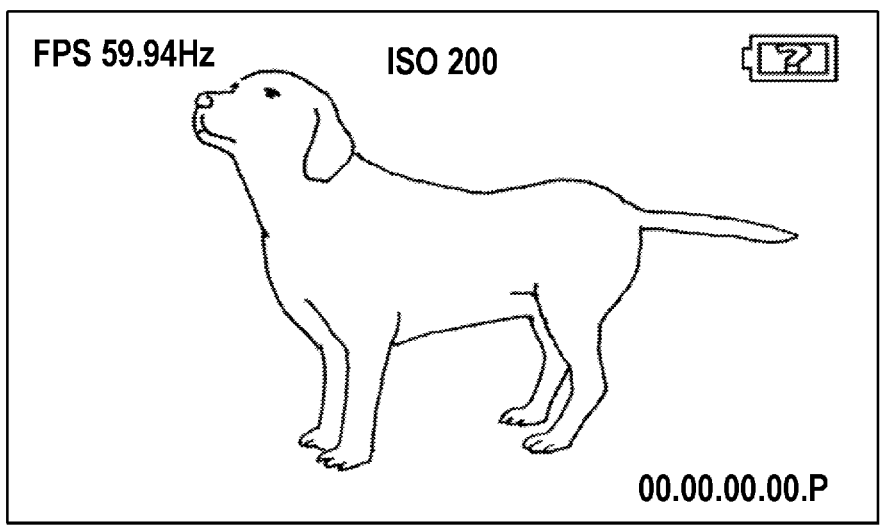

In S410, as a process of displaying the remaining capability of the battery 114, the CPU 101 performs display control of the display portion 107 and displays a battery icon which enables the user to realize that an unknown battery is being connected on the display portion 107. FIG. 5D shows a display example of displaying a battery icon which enables the user to realize that an unknown battery is being connected. Even in this case, which of the power supply adapter 115 and the battery 114 is the supply source of power of the electronic apparatus 100 varies depending on the input voltage of each power supply in a similar manner to S409. Since the user is unable to comprehend the remaining capability of the battery with this battery icon, it can be said that the remaining battery capability is not displayed in this case.

In S411, since it is determined in S403 that the input voltage of the power supply adapter is smaller than the threshold Th2 set in advance, the CPU 101 determines that a general-purpose power supply adapter is being connected. The CPU 101 performs display control of the display portion 107 and displays an icon which enables the user to realize that a general-purpose power supply adapter is being connected on the display portion 107. FIG. 5D shows a display example of an icon which enables the user to realize that a general-purpose power supply adapter is being connected. As an icon display which enables the user to realize that a general-purpose power supply adapter is being connected according to the present embodiment, for example, icon display control similar to a case where an unknown battery is being connected is performed. It should be noted that an icon similar to a case where an unknown battery is being connected need not be displayed and, for example, a "?" icon may be displayed when an unknown battery is being performed and an "!" icon may be displayed when a general-purpose power supply adapter is being connected. Since it is determined that the battery 114 is not connected, the supply source of power is the power supply adapter 115.

In S412, the CPU 101 measures, via the second determining portion 204, an input voltage of the battery 114 which is input to the second power supply input portion 203 in a similar manner to S404. The CPU 101 determines whether or not the measured input voltage is equal to or higher than the threshold Th3 set in advance. When the input voltage of the battery 114 is equal to or higher than the threshold Th3 set in advance, the CPU 101 determines that the battery 114 is connected and advances to S413. When the input voltage of the battery 114 is smaller than the threshold Th3 set in advance, the CPU 101 determines that the battery 114 is not connected and the step advances to S420.

In S413, the CPU 101 communicates with the CPU 116 inside the battery 114 via the communicating portion 110 and executes an authentication process in a similar manner to S405. Once the authentication process is completed, the step advances to S414.

In S414, the CPU 101 determines whether or not the authentication process executed in S413 has succeeded in a similar manner to S406. When the CPU 101 determines that the authentication process has succeeded, the step advances to S415, but when the CPU 101 determines that the authentication process has not succeeded, the step advances to S419.

In S415, the CPU 101 communicates with the CPU 116 inside the battery 114 via the communicating portion 110 and acquires the "consumption current" and the "remaining dischargeable amount" of the battery 114. Once the process is completed, the step advances to S416.

In S416, using the "consumption current" and the "remaining dischargeable amount" of the battery 114 acquired in S415, the CPU 101 calculates the drivable time of the electronic apparatus 100 according to Expression 1. Once the process is completed, the step advances to S417.

In S417, the CPU 101 communicates with the CPU 116 inside the battery 114 via the communicating portion 110 and acquires information on the "capacity" (the remaining capacity) described with reference to FIG. 3B from the battery 114 in a similar manner to S407. Once the process is completed, the step advances to S418.

In S418, the CPU 101 performs display control of the display portion 107 and displays the battery icon in accordance with the remaining capacity and the drivable time of the electronic apparatus 100 calculated in S416. FIG. 5B shows a display example of the battery icon and the drivable time of the electronic apparatus 100 calculated in S416. In S418, unlike in S409, since the power supply adapter 115 is not connected, the supply source power supply is inevitably the battery 114. Therefore, the consumption current of the battery 114 stabilizes and a highly-accurate drivable time of the electronic apparatus 100 can be calculated according to Expression 1. By displaying a specific and highly accurate drivable time in this manner, the user can comprehend a power supply status more accurately than displaying the remaining capacity of the battery 114.

In S419, as a process of displaying the remaining capability of the battery 114, the CPU 101 performs display control of the display portion 107 and displays a battery icon such as that shown in FIG. 5D which enables the user to realize that an unknown battery is being connected in a similar manner to S410. In this case, since the power supply adapter 115 is not connected, the supply source power supply is inevitably the battery 114. It should be noted that since the user is unable to comprehend the remaining capability of the battery with this battery icon, it can be said that the remaining battery capability is not displayed in this case.

In S420, as a process of displaying the remaining capability of the battery 114, the CPU 101 performs display control of the display portion 107 and performs a hiding process of the battery icon on the display portion 107 in a similar manner to S408. In the present embodiment, since it is determined that both the power supply adapter 115 and the battery 114 are not connected to the electronic apparatus 100, it is assumed that nothing including a video (an image) is displayed on the display portion 107 of the electronic apparatus 100.

As described above, display through the four display appearances shown in FIGS. 5A to 5D enables the user to more accurately comprehend the power supply status of the electronic apparatus 100. When a remaining capability of the battery 114 is not displayed as shown in FIG. 5A, the power supply adapter 115 having an input voltage that is equal to or higher than a certain level is being connected. Therefore, the user can recognize that the supply source of power is the power supply adapter 115 having an input voltage that is equal to or higher than a certain level and that the electronic apparatus 100 can be driven in a sustained manner. When a battery icon and a drivable time are displayed as shown in FIG. 5B, the user can recognize that the supply source of power is the battery 114 and that the electronic apparatus 100 can be driven within the displayed drivable time. When a battery icon and a remaining capacity are displayed as shown in FIG. 5C, the user can recognize that there is a possibility of the supply source of power being switched and the charge status of the battery 114 can be comprehended from the displayed remaining capacity. When an icon indicating that an unauthenticated battery or a general-purpose power supply adapter is connected is displayed as shown in FIG. 5D, the user can presume that the battery 114 and the power supply adapter 115 are not genuine products or have deteriorated. Therefore, the user can recognize that the power supply status of the electronic apparatus 100 is unstable.

It should be noted that, in FIGS. 5B and 5C, since a drivable time or a remaining capacity is displayed, displaying a battery icon is not essential. In addition, in the present embodiment, the display appearances shown in FIGS. 5A to 5D are not switched in accordance with a magnitude of the "capacity" (the remaining capacity) of the battery 114.

As described above, in an electronic apparatus to which a battery and a power supply adapter can be connected and which selects a power supply to supply power in accordance with power supply capabilities of the battery and the power supply adapter, a user can more accurately comprehend a power supply status of the electronic apparatus. For example, when there is a possibility that the battery and the power supply adapter are to be frequently switched as a supply source of power, a remaining capacity instead of a drivable time is displayed as a remaining capability of the battery. Therefore, in this case, the user can comprehend a highly-accurate power supply status of the electronic apparatus based on the remaining capacity without erroneously recognizing that the electronic apparatus can be driven over a displayed drivable time.

<First Modification>

In the first embodiment, an example was described in which a power supply adapter 115 and an authenticated battery 114 are connected to an electronic apparatus 100 and a remaining capacity is displayed when an input voltage of the power supply adapter 115 is lower than the threshold Th2 (S409). However, this configuration is not restrictive and a different remaining battery capability display will be described in the present modification with reference to FIGS. 6A and 6B.

Figure 6A:
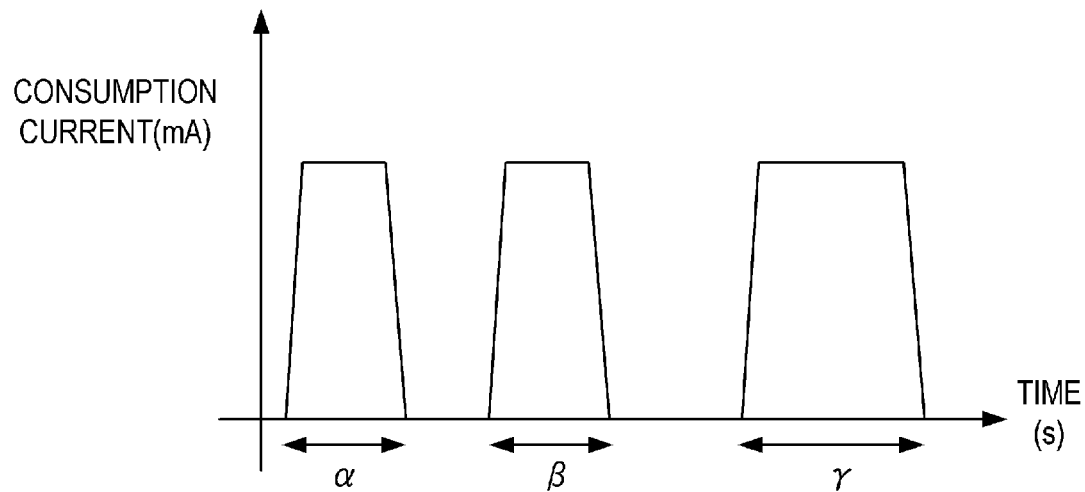
FIGS. 6A and 6B are diagrams showing an example of remaining battery capability display according to a first modification.
Figure 6B:
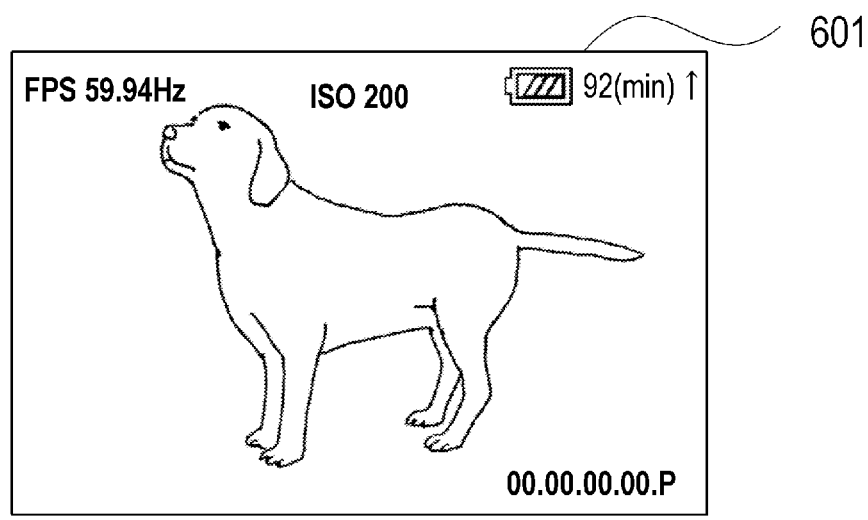

FIG. 6B represents an example of a remaining battery capability display that differs from the first embodiment described above. This display may be performed when input voltages of the power supply adapter 115 and the battery 114 have more or less a same potential and a consumption current of the battery 114 changes as shown in FIG. 6A. In this example, the consumption current flows as indicated by sections α, β, and γ when the battery 114 is a supply source power supply but the consumption current does not flow as indicated by sections other than α, β, and γ when the power supply adapter 115 is the supply source power supply. In other words, the battery 114 does not consume power in the sections other than α, β, and γ.

Therefore, the CPU 101 calculates drivable times of the electronic apparatus 100 in the sections α, β, and γ and, on the display portion 107, performs display which indicates that an actual drivable time of the electronic apparatus 100 is longer than a calculated time (a calculated drivable time) and which presents the calculated time (which indicates that a remaining time is longer). Specifically, using a result of the calculation, the CPU 101 performs display of ""calculated time" ↑" as shown in a region 601 in FIG. 6B. Since a calculated time and the fact that the actual drivable time of the electronic apparatus 100 is longer than the calculated time need only be indicated, the display is not limited to ""calculated time" ↑" and ""calculated time" and a little extra", ""calculated time" or longer", or the like may be displayed instead.

As described above, according to the first modification, the calculated drivable time of the electronic apparatus 100 and "↑" indicating that the actual drivable time is longer than the calculated drivable time are displayed. As a result, the user is able to comprehend that a supply source of power may possibly be switched between the power supply adapter 115 and the battery 114 and that the electronic apparatus 100 can be driven longer than the displayed time.

<Second Modification>

A case where a battery is assumed to be connected to and disconnected from an electronic apparatus has been described in the first embodiment. In a second modification, an example will be described in which it is assumed that an authenticated battery is built into an electronic apparatus, the battery cannot be readily disconnected, and the battery is always connected to the electronic apparatus. It should be noted that configurations of the electronic apparatus system and the electronic apparatus 100 according to the present modification are similar to those according to the first embodiment and are as shown in FIG. 1.

Figure 7:
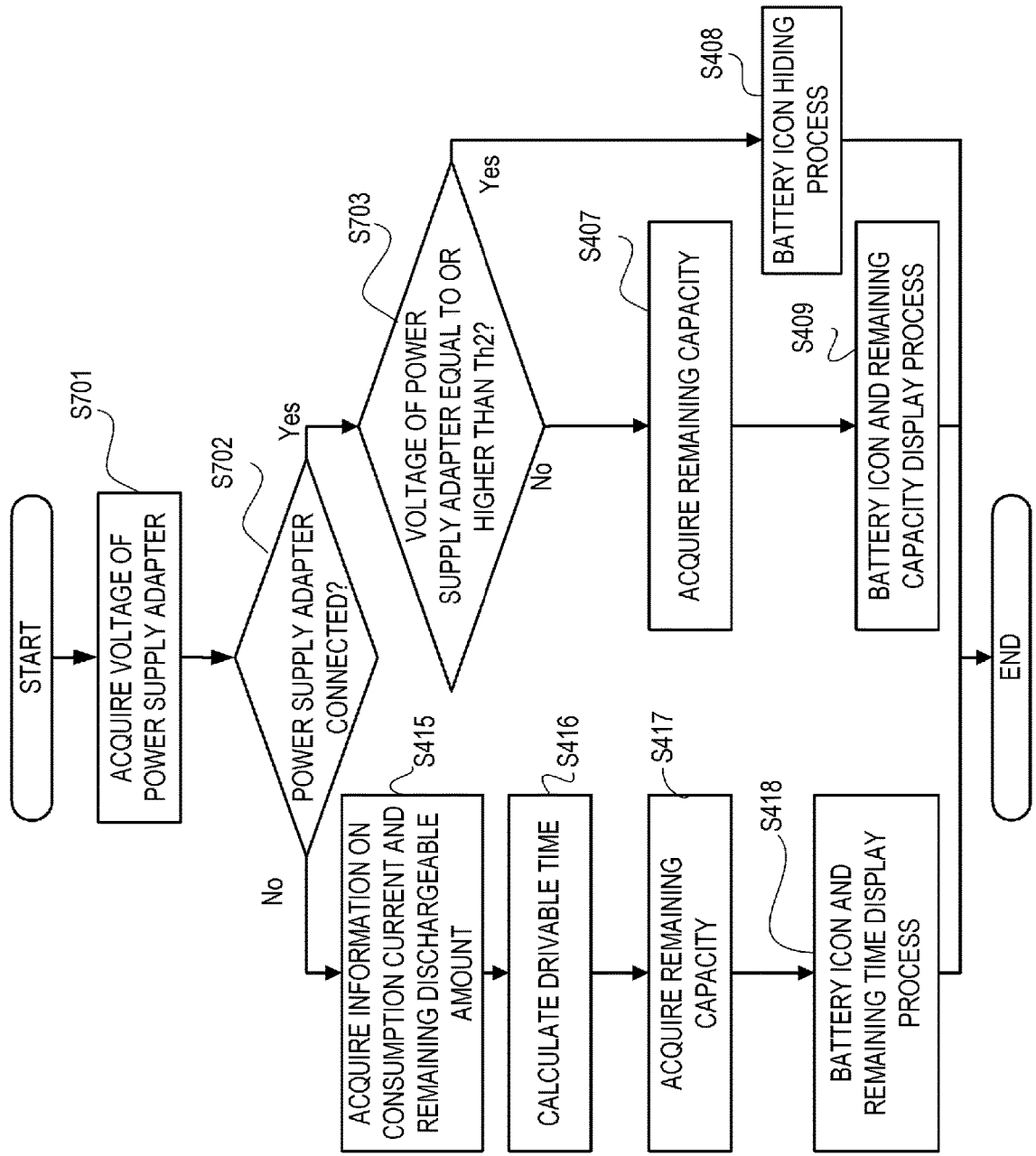
FIG. 7 is a processing flow chart of remaining battery capability display according to a second modification.

A processing flow chart of displaying a remaining battery capability of the electronic apparatus 100 according to the present modification is as shown in FIG. 7. Since S407 to S409 and S415 to S418 in FIG. 7 represent the same processes as those described with reference to FIG. 4 in the first embodiment, a description thereof will be omitted. Hereinafter, processes of S701 to S703 will be described. It should be noted that the threshold Th1 and the threshold Th2 described below are the same values as the thresholds denoted by the same reference characters in the first embodiment.

In S701, the CPU 101 measures, via the first determining portion 202, an input voltage of the power supply adapter 115 which is input to the first power supply input portion 201. Once the process is completed, the step advances to S702.

In S702, the CPU 101 determines whether or not the input voltage of the power supply adapter 115 is equal to or higher than the threshold Th1 set in advance. The CPU 101 determines that the power supply adapter 115 is connected when the input voltage of the power supply adapter 115 is equal to or higher than the threshold Th1 set in advance and advances the step to S703. The CPU 101 determines that the power supply adapter 115 is not connected when the input voltage of the power supply adapter 115 is determined to be lower than the threshold Th1 and advances the step to S415.

In S703, the CPU 101 determines whether or not the input voltage of the power supply adapter 115 is equal to or higher than the threshold Th2 set in advance. When the CPU 101 determines that the input voltage of the power supply adapter 115 is equal to or higher than the threshold Th2 set in advance, the CPU 101 advances the step to S408, but when the CPU 101 determines that the input voltage of the power supply adapter 115 is smaller than the threshold Th2, the CPU 101 advances the step to S407.

As described above, display appearances can be changed in the three cases described below depending on whether or not the power supply adapter 115 is connected to the electronic apparatus 100 and in accordance with power supply capabilities of the power supply adapter 115 and the battery 114.

(1) When both the power supply adapter 115 and the battery 114 are connected to the electronic apparatus 100 and the input voltage of the power supply adapter 115 is lower than the threshold Th2, a battery icon and a remaining capacity are displayed as shown in FIG. 5C.

(2) When only the battery 114 is connected to the electronic apparatus 100 and the power supply adapter 115 is not connected to the electronic apparatus 100, a battery icon and a drivable time are displayed as shown in FIG. 5B.

(3) When both the power supply adapter 115 and the battery 114 are connected to the electronic apparatus 100 and the input voltage of the power supply adapter 115 is equal to or higher than the threshold Th2, a remaining capability of the battery 114 is not displayed as shown in FIG. 5A.

Moreover, in the case of (2) described above, a remaining capacity may also be displayed. Alternatively, as in the first modification, a display which represents a calculated drivable time and which indicates the fact that the actual drivable time is longer than the calculated time (a display indicating that the remaining time is longer) instead of a remaining capacity may be performed. In other words, when a remaining capability display is performed, a display indicating at least any of a remaining time, the fact that the remaining time is longer, and a remaining capacity is performed. In addition, the CPU 101 may control display so that a same remaining capability display is not performed in the case of (1) and the case of (2) in order to clarify a difference between the two cases. In other words, the CPU 101 prevents display in the display appearance of the case of (1) from being performed in the case of (2) and, conversely, prevents display in the display appearance of the case of (2) from being performed in the case of (1).

As described above, in the second modification in which it can be assumed that an authenticated battery 114 is connected, a display appearance can be changed by a simpler process than in the first embodiment but, at the same time, a same effect as the first embodiment can be obtained.

It should be noted that the various controls described above as controls to be performed by the CPU 101 may be carried out by one piece of hardware or a plurality of pieces of hardware (for example, a plurality of processors or circuits) may control an entire apparatus (electronic apparatus) by sharing processes.

In addition, while the present invention has been described in detail based on a preferred embodiment thereof, the present invention is not limited to the specific embodiment and various modes without departing from the scope of the invention are also included in the present invention.

Furthermore, the embodiment described above simply represents an example of the present invention and the embodiment can also be combined with other embodiments.

Moreover, while an example in which the present invention is applied to an image pickup device has been described in the embodiment presented above, the present invention is not limited to this example and can be applied to any electronic apparatus to which two or more power supplies can be connected. Specifically, the present invention can be applied to a personal computer, a PDA, a mobile phone terminal, a mobile image viewer, a printer apparatus equipped with a display, a digital photo frame, a music player, a game device, an electronic book reader, an electric home appliance, a smart speaker, and the like. In addition, the present invention can also be applied to a control device which controls these electronic apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-56275, filed on Mar. 23, 2018, which is hereby incorporated by reference herein in its entirety.

What is claimed is:

1. An electronic apparatus comprising:
a first power receiving unit;
a second power receiving unit; and
a memory and at least one processor and/or at least one circuit configured to perform as the following units:
a first determining unit that determines a power supply capability of a first power supply connected to the first power receiving unit;
a second determining unit that determines a power supply capability of a second power supply connected to the second power receiving unit;
a control unit that performs control so that power is received from whichever of the first power supply and the second power supply that has a higher power supply capability, in a first case where the first power supply is connected to the first power receiving unit, the second power supply is connected to the second power receiving unit, and the power supply capability of the first power supply connected to the first power receiving unit does not satisfy a predetermined criterion; and
a display control unit that performs control so that
a remaining capability of the second power supply connected to the second power receiving unit is displayed in a first display appearance which is a display appearance that shows the remaining capability by other than a remaining time or a display appearance indicating that an actual drivable time is longer than a displayed time in the first case,
wherein the display control unit performs control so that the remaining capability of the second power supply connected to the second power receiving unit is displayed in a second display appearance which indicates the remaining time, in a second case where the first power supply is not connected to the first power receiving unit but the second power supply is connected to the second power receiving unit, and
wherein the display control unit performs control so that the remaining capability of the second power supply connected to the second power receiving unit is not displayed, in a third case where the first power supply is connected to the first power receiving unit, the second power supply is connected to the second power receiving unit, and the power supply capability of the first power supply connected to the first power receiving unit satisfies the predetermined criterion.

2. The electronic apparatus according to claim 1, wherein the display control unit performs control so that
the remaining capability of the second power supply connected to the second power receiving unit is not displayed in the second display appearance in the first case, and
wherein the display control unit performs control so that the remaining capability of the second power supply connected to the second power receiving unit is not displayed in the first display appearance in the second case.

3. The electronic apparatus according to claim 1, wherein the display control unit performs control so that
the remaining capability of the second power supply connected to the second power receiving unit is displayed in a display appearance that shows the remaining capability by other than a remaining time or a display appearance indicating that an actual drivable time is longer than a displayed time, in the first case.

4. The electronic apparatus according to claim 1, wherein the first power supply connected to the first power receiving unit is an external power supply, and the second the power supply connected to the second power receiving unit is a battery.

5. The electronic apparatus according to claim 1, wherein the first display appearance is a display appearance in which a remaining capacity of the second power supply connected to the second power receiving unit is expressed as a percentage instead of time.

6. The electronic apparatus according to claim 1, wherein the first display appearance represents a remaining time that is a time during which the electronic apparatus can be driven by the remaining capability of the second power supply connected to the second power receiving unit.

7. The electronic apparatus according to claim 1, wherein the memory and the at least one processor and/or the at least one circuit function as an acquisition unit that acquires information on a remaining capacity from the second power supply connected to the second power receiving unit, and
the first display appearance is a display appearance that is displayed based on the remaining capacity acquired by the acquisition unit.

8. The electronic apparatus according to claim 7, wherein the acquisition unit acquires, from the second power supply connected to the second power receiving unit, information on a consumption current of the second power supply and information on a remaining discharge amount that is a total amount of power to be supplied by the second power supply.

9. The electronic apparatus according to claim 8, wherein the display control unit performs control so that
the remaining capability of the second power supply connected to the second power receiving unit is displayed in a second display appearance which indicates a remaining time based on the information on the consumption current and the information on the remaining discharge amount, in the second case.

10. The electronic apparatus according to claim 8, wherein the first display appearance is a display appearance which can be displayed without being based on the information on the consumption current.

11. The electronic apparatus according to claim 7, wherein
the display of the remaining capability is a display including an icon with a pattern that differs depending on a magnitude of the remaining capacity.

12. The electronic apparatus according to claim 1, wherein the display control unit does not switch between the first display appearance and another display appearance in accordance with a remaining capability of the second power supply connected to the second power receiving unit.

13. The electronic apparatus according to claim 1, wherein the predetermined criterion is satisfied when the power supply capability of the first power supply is equal to or higher than a reference value.

14. The electronic apparatus according to claim 1, wherein the power supply capability of the first power supply is a magnitude of voltage.

15. The electronic apparatus according to claim 1, wherein
the display control unit authenticates the second power supply connected to the second power receiving unit, and
wherein the display control unit performs control so as not to display the remaining capability of the second power supply but to display information indicating that the second power supply is unknown, in a case where the second power supply is an unauthenticated power supply.

16. A method comprising:
determining a power supply capability of a first power supply connected to a first power receiving unit of an electronic apparatus;
determining a power supply capability of a second power supply connected to a second power receiving unit of the electronic apparatus;
performing control so that power is received from whichever of the first power supply and the second power supply that has a higher power supply capability, in a first case where the first power supply is connected to the first power receiving unit, the second power supply is connected to the second power receiving unit, and the power supply capability of the first power supply connected to the first power receiving unit does not satisfy a predetermined criterion;
performing control so that
the remaining capability of the second power supply connected to the second power receiving unit is displayed in a first display appearance which is a display appearance that shows the remaining capability by other than a remaining time or a display appearance indicating that an actual drivable time is longer than a displayed time, in the first case;
performing control so that the remaining capability of the second power supply connected to the second power receiving unit is displayed in a second display appearance which indicates the remaining time, in a second case where the first power supply is not connected to the first power receiving unit but the second power supply is connected to the second power receiving unit; and
performing control so that the remaining capability of the second power supply connected to the second power receiving unit is not displayed, in a third case where the first power supply is connected to the first power receiving unit, the second power supply is connected to the second power receiving unit, and the power supply capability of the first power supply connected to the first power receiving unit satisfies the predetermined criterion.

17. A non-transitory storage medium that stores a program, causing a computer to execute a method, the method comprising:
determining a power supply capability of a first power supply connected to a first power receiving unit of an electronic apparatus;
determining a power supply capability of a second power supply connected to a second power receiving unit of the electronic apparatus;
performing control so that power is received from whichever of the first power supply and the second power supply that has a higher power supply capability, in a first case where the first power supply is connected to the first power receiving unit, the second power supply is connected to the second power receiving unit, and the power supply capability of the first power supply connected to the first power receiving unit does not satisfy a predetermined criterion;
performing control so that
the remaining capability of the second power supply connected to the second power receiving unit is displayed in a first display appearance which is a display appearance that shows the remaining capability by other than a remaining time or a display appearance indicating that an actual drivable time is longer than a displayed time, in the first case;
performing control so that the remaining capability of the second power supply connected to the second power receiving unit is displayed in a second display appearance which indicates the remaining time, in a second case where the first power supply is not connected to the first power receiving unit but the second power supply is connected to the second power receiving unit; and performing control so that the remaining capability of the second power supply connected to the second power receiving unit is not displayed, in a third case where the first power supply is connected to the first power receiving unit, the second power supply is connected to the second power receiving unit, and the power supply capability of the first power supply connected to the first power receiving unit satisfies the predetermined criterion.

* * * * *